April 13, 1937.  R. F. RUNGE  2,076,920
CAGE FOR BALL BEARINGS
Filed April 15, 1936
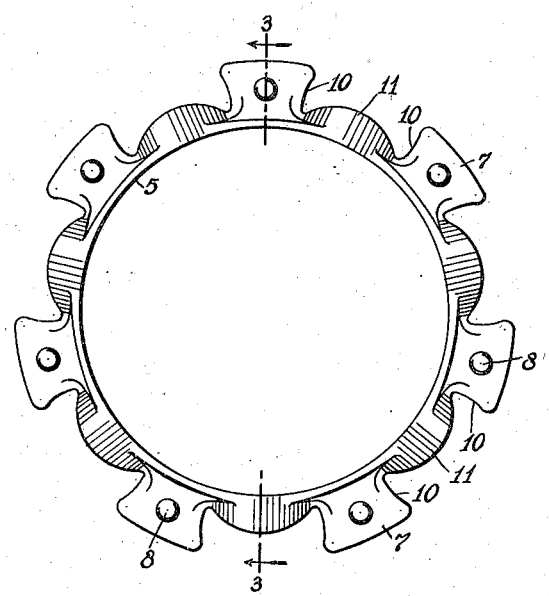
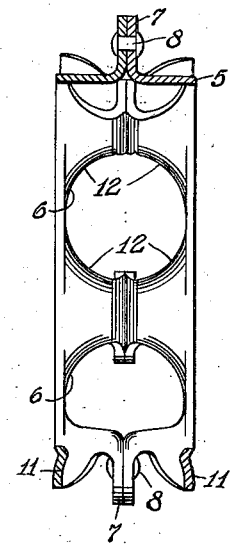
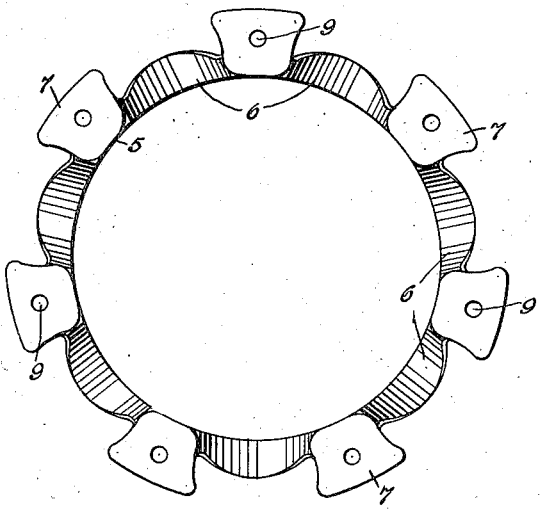
INVENTOR
ROBERT F. RUNGE
BY
ATTORNEY Patented Apr. 13, 1937

2,076,920

UNITED STATES PATENT OFFICE 2,076,920

CAGE FOR BALL BEARINGS

Robert F. Runge, Philadelphia, Pa., assignor to S K F Industries, Inc., Philadelphia, Pa., a corporation of Delaware Application April 15, 1936, Serial No. 74,407

3 Claims. (Cl. 308—201)

This invention relates to a cage for ball bearings and preferably one which is formed from two similar sheet metal parts. The object of the invention is primarily to provide a light, inexpensive, durable cage which has flexibility in the parts where flexibility is required and rigidity in the parts where flexibility is not required.

In the drawing accompanying this specification and forming part of the application, one practicable form or embodiment of the invention is illustrated, in which drawing:

Figure 1 is an elevation of one side of the cage,

Figure 2 is an inside elevation of one of the cage parts, and

Figure 3 is a section of a cage taken at about the plane of the line 3—3 in Figure 1.

The preferred form of this cage is made of two identical sheet metal parts which, and when suitably secured together, hold the balls of a ball bearing in proper relative positions. Each of these cage parts comprises a substantially cylindrical body portion 5 having a series of openings 6, each constituting half of a ball pocket. The body portion carries an outwardly disposed web 7.

Regarding the cage as a whole, that is having two of the half members secured together, as for instance by means of rivets 8 passing through holes 9 formed in the flange members 7, there is a cylindrical body portion composed of two of the members 5 and upon which is carried the centrally disposed web which is shown curved as at 10 to fit the balls and adapted to contact with them on a narrow zone at their rolling diameter. There are, carried by the body portions 5, side flaps 11 bent up from the body portion and free of the centrally disposed web. The flaps are for laterally stabilizing the cage. These flaps taper off toward the web. Owing to their general formation they might be called "eye-brow" flaps, and in fact the cage itself will probably be known as an "eye-brow cage".

Each of the ball pockets consists of two pairs of the curved surfaces 10, two of the eye-brows 11 and the four rounding faces 12 formed in the cylindrical body portions 5.

The cage is particularly designed for use in an annular deep-groove bearing in which it is applied to the balls after these are assembled between the inner and outer race rings and have been properly spaced apart one from the other.

Although but one form of my invention is illustrated in the drawing and description in detail, yet it is apparent that changes may be made within the scope of the claims without departing from the spirit of the invention.

Having thus described my invention, I claim and desire to secure by Letters Patent:

1. A cage for ball bearings comprising a substantially cylindrical body portion having openings for the balls, a narrow, centrally disposed web curved to fit the balls and adapted to contact with them on a narrow zone at their rolling diameter, and side flaps bent up from the body portion and free of the web for engaging the sides of the balls and laterally stabilizing the cage.

2. A cage for ball bearings comprising a substantially cylindrical body portion having openings for the balls, a narrow, centrally disposed web curved to fit the balls and adapted to contact with them on a narrow zone at their rolling diameter, and side flaps bent up from the body portion and tapering off toward the web for engaging the sides of the balls for laterally stabilizing the cage.

3. A cage for ball bearings formed of two identical sheet metal parts, comprising a substantially cylindrical body portion having openings, each constituting half of a ball pocket, a narrow centrally disposed web curved to fit the balls and adapted to contact with them on a narrow zone at their rolling diameter, there being side flaps bent up from the body portion and free of the web for engaging the sides of the balls for laterally stabilizing the cage, and means for securing the webs of the two parts together.

ROBERT F. RUNGE.